Oct. 24, 1950 P. KOLLSMAN 2,526,672
APPARATUS FOR CONTROLLING THE FLOW OF FLUIDS
Filed Feb. 28, 1946 3 Sheets-Sheet 2

INVENTOR.
PAUL KOLLSMAN
BY
Albert M. Austin
his ATTORNEY

Oct. 24, 1950        P. KOLLSMAN        2,526,672
APPARATUS FOR CONTROLLING THE FLOW OF FLUIDS
Filed Feb. 28, 1946        3 Sheets-Sheet 3
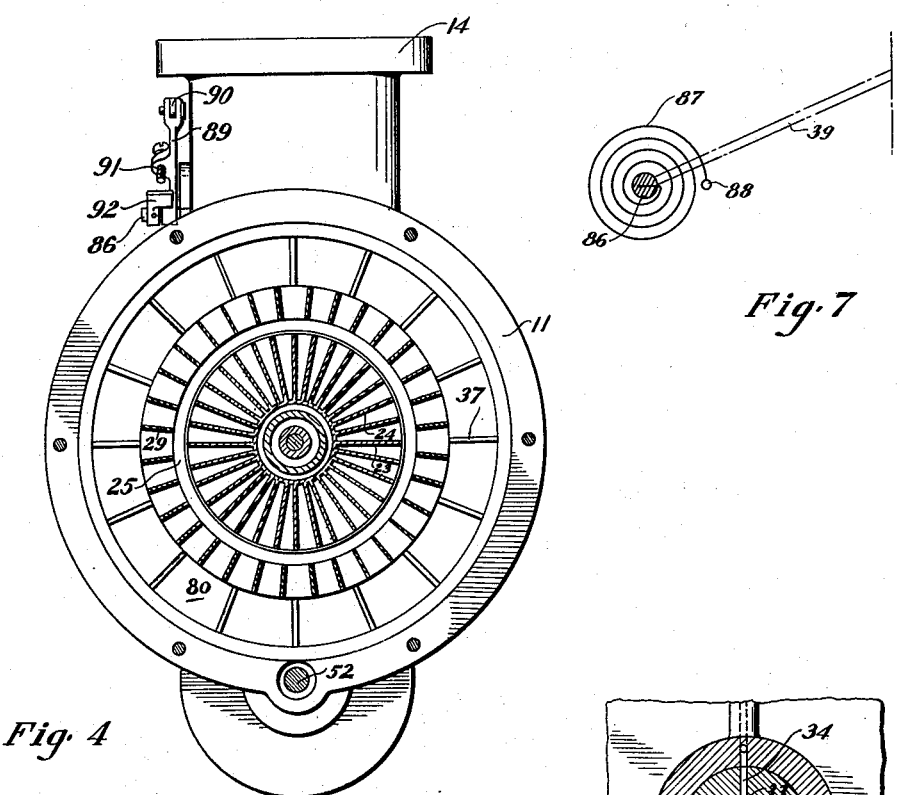
Fig. 4
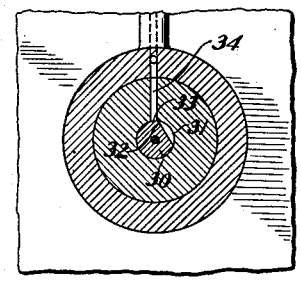
Fig. 7
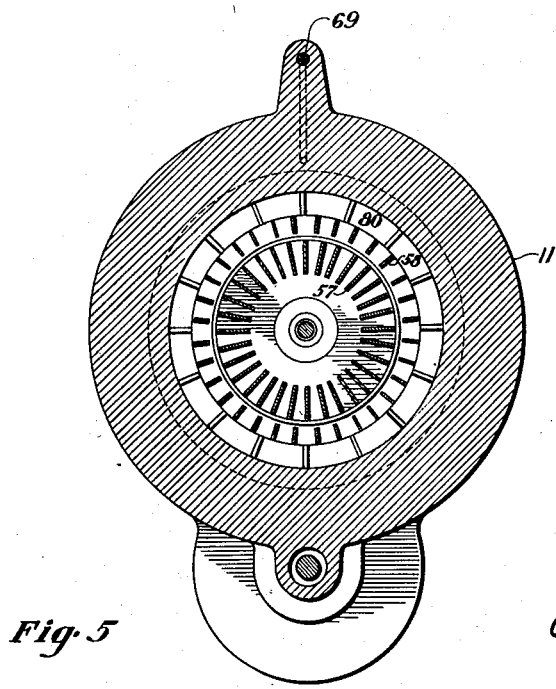
Fig. 6
Fig. 5
INVENTOR.
PAUL KOLLSMAN
BY
Albert M. Austin
his ATTORNEY Patented Oct. 24, 1950

2,526,672

UNITED STATES PATENT OFFICE 2,526,672

APPARATUS FOR CONTROLLING THE FLOW OF FLUIDS

Paul Kollsman, New York, N. Y.

Application February 28, 1946, Serial No. 650,845

5 Claims. (Cl. 103—1)

This invention provides a method of, and apparatus for, controlling the flow of a plurality of different fluids to maintain a predetermined ratio therebetween. The invention has particular application to a control method and apparatus for maintaining constant the ratio between a plurality of flows of fluid, the flows being so controlled that the weight flows of the several fluids maintain a constant relationship.

According to the invention, the particles of the individual fluids are accelerated to a predetermined velocity, the energy is determined which is required for accelerating each of the fluids, and the flow of one or several of the fluids is then controlled in such manner as to maintain the ratio between the respective energies constant.

The control method and apparatus embodying the present invention are particularly suited for the control of fluids of variable density and are well adapted for controlling the ratio between the flow of a gas and the flow of a liquid, the accuracy of the control being unaffected even by entry of considerable quantities of gas or air into the duct through which the liquid flows.

The various objects, features and advantages of this invention will appear more fully from the detailed description which follows, accompanied by drawings, showing for the purpose of illustration a preferred embodiment of the invention.

The invention also consists of certain new and original features of construction in combination of parts as well as steps and combination of steps as hereinafter set forth and claimed.

Although the characteristic features of this invention which are believed to be novel will be particularly pointed out in the claims appended hereto, the invention itself, its objects and advantages, and the manner in which it can be carried out may be better understood by referring to the following description taken in connection with the accompanying drawings forming a part of it, in which:

Fig. 4 is a section taken on line 4—4 of Fig. 1;

Fig. 5 is a section taken on line 5—5 of Fig. 1;

Fig. 6 is an enlarged sectional view of a detail of the device shown in Fig. 1, the section being taken on line 6—6; and Fig. 7 is a detailed view of a spring loaded throttle valve of the apparatus shown more particularly in Figs. 1 and 3.

Figure 1:
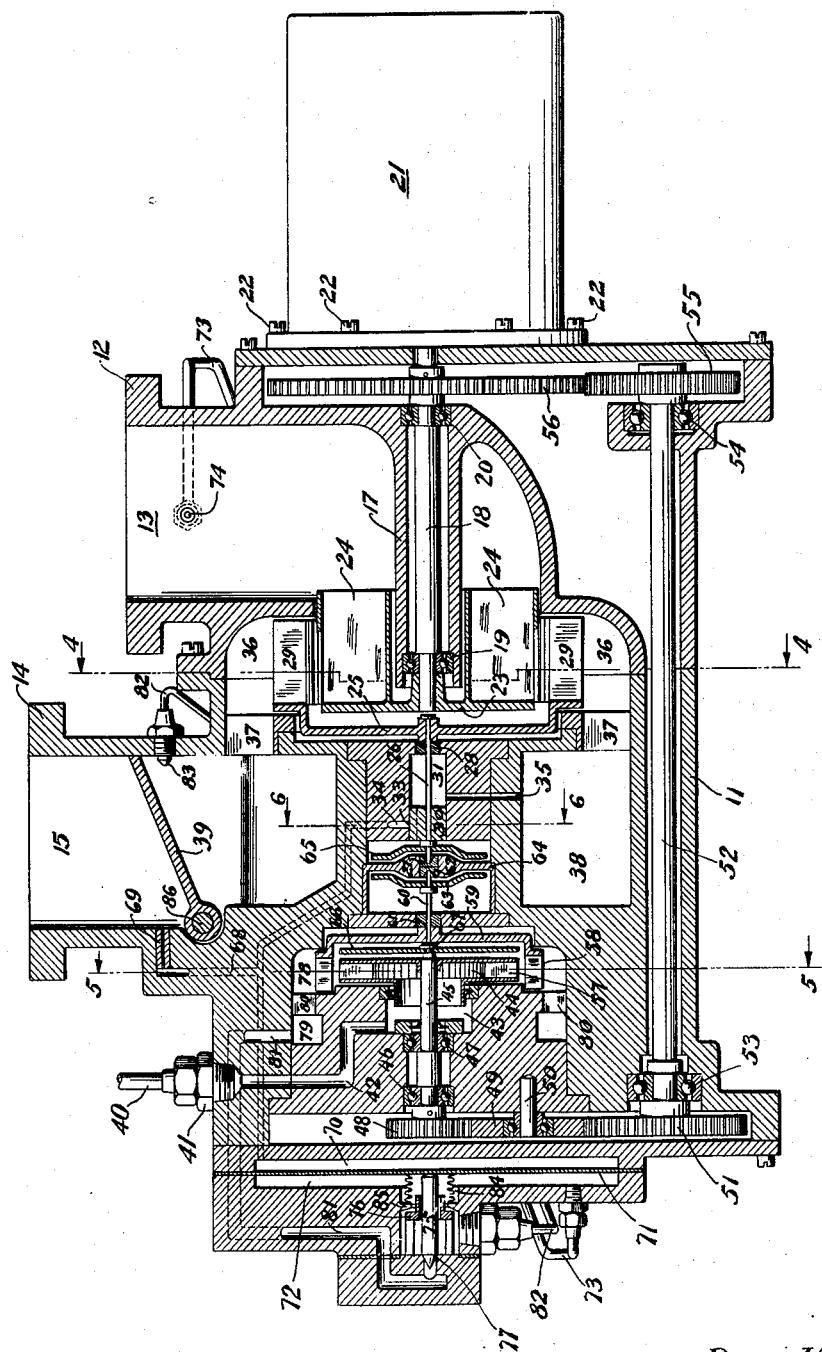
Fig. 1 is a sectional side elevation of an automatic regulator for proportioning the flow of a liquid to the flow of a gas; the section being taken on line 1—1 of Fig. 2.
Figure 2:
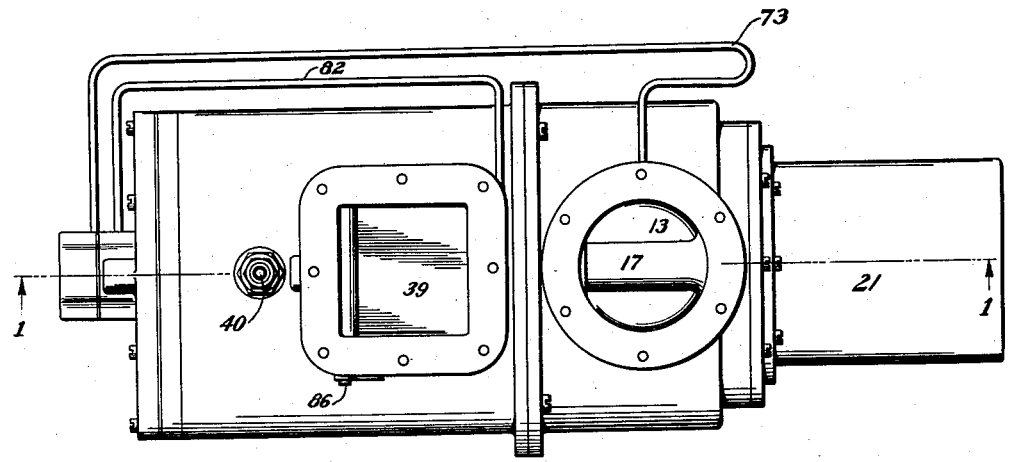
Fig. 2 is a plan view of the apparatus shown in Fig. 1.

In the following description and in the claims, various details will be identified by specific names for convenience, the names, however, are intended to be as generic in their application as the art will permit. Like reference characters refer to like parts in the several figures of the drawing.

In the drawings accompanying and forming part of this specification, certain specific disclosure of the invention is made for the purpose of explanation of broader aspects of the invention, but it is understood that the details may be modified in various respects without departure from the principles of the invention and that the invention may be applied to, and practiced by, other structures than the one shown.

In the description, the term "pressure fluid" or "fluid" will be used as a generic term, denoting non-compressible as well as compressible fluids, for example, liquids and gases, and mixtures of liquids and gases.

Referring to the drawing, the apparatus shown in Fig. 1 comprises a housing 11 having an inlet flange 12 leading to an inlet passage 13 and an outlet flange 14 at the end of an outlet passage 15. The outlet passage 15 is normally connected to a point of reduced pressure, for example the intake duct of an internal combustion engine indicated in dotted lines in Fig. 3. The inlet passage of the apparatus leads to a point of atmospheric pressure, for example, the conventional intake air filter commonly used for carburetors of internal combustion engines.

A central stud 17 in the inlet passage supports a drive shaft 18 in bearings 19 and 20. The shaft 18 is driven by a motor 21 secured to the housing by screws 22, and carries at its end an impeller 23 having substantially radial blades 24. The motor 21 is preferably a constant speed motor although this is not necessary.

The impeller 23 is in the nature of a rotor of a centrifugal pump and imparts to the air or gas passing through the intake duct 13 a rotary motion about the axis of the drive shaft 18.

A rotor 25 having a shaft 26 is supported in bearings 27 and 28. The rotor 25 has a plurality of substantially radially extending vanes 29 adjacent the periphery of the impeller 23. Air or gas issuing from the blades 24 of the impeller impacts upon the vanes 29 of the rotor and exerts a certain reactive torque thereon tending to turn the rotor about its axis.

A rotary valve member 30 in the valve chamber 31 is fixed on the rotor shaft 26 and has a control edge 32 adapted to cover and uncover a control port 33 leading to a control duct 34. Details of this valve are shown in greater detail in Figure 6. Air or gas of substantially atmospheric pressure may enter the valve chamber 31 through a passage 35.

Air leaving the vanes 29 of the rotor 25 enters an annular chamber 36 and thence flows through passages 37 into an enlarged air chamber 38 separated from the outlet passage 15 by a movable throttle valve member 39.

A liquid, for example gasoline, is supplied to the regulator through a supply duct 40 leading to a pipe connection 41 in the housing 11. A duct 42 leads from the pipe connection 41 to a central chamber 43 in which a further impeller 44 turns. The impeller 44 is mounted on a shaft 45 supported in bearings 46 and 47. A drive pinion 48 is secured to the end of the impeller shaft and meshes with an intermediate gear 49 on a stud shaft 50. The intermediate gear, in turn, meshes with a further gear 51 on a shaft 52 extending through the length of the housing 11 and turning in bearings 53 and 54. The other end of the shaft 52 carries the pinion 55 meshing with a drive gear 56 on the drive shaft 18 of the motor 21. It is thus evident that the impeller 23 in the gas passage and the impeller 44 in the liquid passage are driven at a constant speed ratio which is maintained at all times even if the speed of the motor 21 may change.

The liquid impeller 44 has substantially radially extending blades 57 adapted to impart a circular motion about the drive shaft 45 to the particles of liquid flowing through the duct 42 and entering the impeller.

The impeller 44 is surrounded by substantially radially extending vanes 58 of a rotor or fluid obstacle 59. The rotor 59 is mounted on a shaft 60 rotatable in bearings 61 and 62. A permanent magnet 63 on the end of the rotor shaft 60 is magnetically coupled through a wall 64 in the housing 11 with a similar magnet 65 on the end of the shaft 26 of the rotor 25 associated with the air impeller 23.

The intermediate gear 49 in the drive of the liquid impeller 44 causes the liquid impeller to spin in a direction opposite to that of the air impeller 23. As a result, a torque is exerted by the impact of the accelerated liquid particles on vanes of the rotor 59 which is opposed to the direction of the torque exerted by the rotor 25 acted upon by air. The torque of the rotor is transmitted to the rotary valve member 30 by the magnetic coupling 63, 65 acting through the liquid-tight wall 64 of the housing. It is evident that if the torque exerted on the liquid rotor 59 is equal to the torque exerted on the air rotor 25, the rotary valve 30 will not move with respect to control port 33.

A floating disc 66 is freely rotatable on an extension 67 of the rotor shaft 45 to decrease the drag which would otherwise be exerted on the rotor 59 by liquid friction between it and the impeller 44. Liquid particles accelerated by the outer wall of the impeller 44 exert a certain drag on the floating disk 66, causing the disk to rotate very slowly on the shaft extension 67. The disk 66 is braked by the liquid between it and the wall of the rotor 59 which for practical purposes may be considered as stationary. The drag exerted by the disk 66 on the adjacent wall of the rotor 59 is negligible due to the greatly reduced rate at which the disk turns.

Air at approximately atmospheric pressure enters the valve chamber 31 of the rotary valve 30 through the passage 35. Air is withdrawn from the valve chamber 31 through the control duct 34 which communicates with a branch duct 68 leading to a constricted passage 69 opening into the air outlet passage 15. Since the outlet passage 15 is a point of reduced pressure due to its connection to the intake of a combustion engine or to some other source of suction, a reduced control pressure is created in the branch duct 68 and the control duct 34. The control pressure is equal to the pressure existing at the constricted passage 69 when the rotary valve 30 is closed, and ranges up to nearly atmospheric pressure when the rotary valve 30 is fully open. It thus becomes evident that the pressure in the control duct 34 is controllable by the rotary valve 30 and thus becomes a function of the torque differential of the air rotor 25 and the liquid rotor 59.

The control duct 34 leads to a diaphragm chamber 70 one wall of which is formed by a flexible diaphragm 71. The diaphragm separates the chamber 70 from a further chamber 72 communicating with a point of substantially atmospheric pressure through a conduit 73 leading to a port 74 in the inlet passage 13.

The diaphragm 71 acts upon a movable valve member 75 guided in a sleeve 76 and controlling a valve port 77. The diaphragm 71 tends to keep the valve port 77 closed when equal pressures exist in the chambers 70 and 72. The valve port 77 opens if reduced pressure acts on the diaphragm in chamber 70 causing the diaphragm to deflect to the right. This condition is brought about by closing of the control valve port 33 by the rotary valve member 30 permitting maximum suction to be applied to the chamber 70 through the branch duct 68 and the constricted passage 69.

Liquid leaving the vanes 58 of the rotor 59 enters an annular chamber 78 communicating with a further annular chamber 79 through passages 80. The liquid flows from the annular chamber 79 through a duct 81 leading to the control valves 75, 77. A controlled quantity of liquid is admitted through the control port 77 and enters a duct 82 leading to a nozzle 83 in the air chamber 38 at a point near the throttle valve 39, which is a point at which the air or gas travels at a relatively high velocity to insure intimate mixture between the air and the liquid injected therein.

Liquid flowing through the valve 75, 77 is prevented from entering the diaphragm chamber 72 by a bellows or sylphon 84 between the diaphragm 71 and an annular wall 85 in the housing.

Mixture of gas and liquid, for example of air and liquid fuel is withdrawn through the outlet passage 15 controlled by the throttle valve 39. The throttle valve 39 is mounted on a shaft 86 freely rotatable in the housing and is acted upon by a spring 87 (see Fig. 7) one end of which is secured to the shaft 86, the other end being secured to a post 88 on the housing 11. The spring 87 tends to keep the throttle valve 39 closed. The throttle valve member 39, on the other hand, is acted upon by the differential pressure across the valve member 39, that is by suction in the outlet passage 15 and by the pressure of the air or gas in the chamber 38. Since normally the pressure in the oulet passage 15 is lower than the pressure in the air chamber 38, the valve member 39 opens until a condition of equilibrium is attained in which the force exerted on the valve member 39 by the pressure differential between the outlet passage 15 and the air chamber 38 is equal to the force of the spring 87 tending to move the valve member in the opposite direction.

Figure 3:
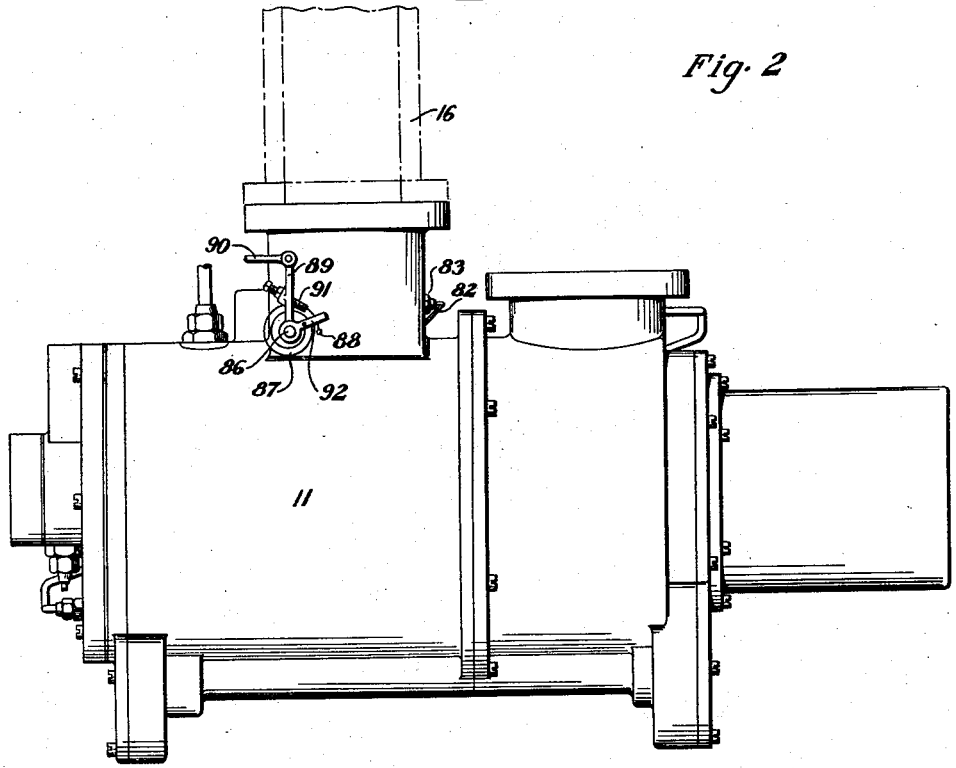
Fig. 3 is a side elevation of the device shown in Figs. 1 and 2.

The position of the valve member 39 is further controlled, and its free movement limited, by limit stop means which may be pre-set from the outside. Details of the stop arrangement are illustrated in Fig. 3.

A pre-settable arm 89 is mounted on the casing for pivotal movement coaxial with the valve shaft 86. The position of the arm 89 is adjustable by a rod 90 leading to a suitable control lever or segment (not shown). A screw 91 is adjustable in the arm 89. A valve arm 92 is secured to the end of the valve shaft 86 and cooperates with the screw 91 forming a stop for the arm limiting the movement of the valve arm 92 in counterclockwise direction. The extent of opening movement of the valve 39 under differential pressure is thus adjustable by the arm 89.

The operation of the fluid ratio regulator is as follows: Air is admitted through the inlet passage 13 and passes through the impeller 23 whose blades 24 accelerate the particles of the air to a tangential velocity equal to the circumferential velocity of the impeller 23. The accelerated air particles leaving the blades of the impeller strike the vanes 29 of the rotor and thus lose their tangential velocity. The impact force exerted on the vanes of the rotor thus becomes proportional to the tangential velocity of the air flow multiplied by its mass. The tangential velocity being constant the impact or torque exerted on the rotor 25 becomes a function of the mass flow of the air flowing through the inlet passage 13.

Liquid fuel admitted through the ducts 40 and 42 enters the impeller 44 and is likewise accelerated to a tangential velocity equal to the circumferential velocity of the air impeller 23. The accelerated liquid particles strike the vanes 58 of the rotor 59 and tend to turn the rotor in direction opposite to the rotor 25.

The liquid fuel leaving the vanes of the rotor 59 flows through the passage 81 to the fuel valve 75, 77 and thence through the duct 82 to the fuel nozzle 83 for injection into the air stream flowing through the outlet passage 15.

Assuming the torque exerted by the air on the rotor 25 is equal to the torque exerted by the liquid on the rotor 59, the two torques cancel out at the magnetic coupling 63, 65 between the rotor shafts 26 and 69 and the rotary valve 30 does not move. If the amount of fuel flowing through the apparatus is momentarily less than the amount to be maintained with respect to the air, the torque exerted on the liquid rotor 59 is reduced, causing the rotary valve member 30 to turn under action of the air rotor 25, reducing the area of the control port 33 to which air is admitted into the control duct 34. The result is a drop in pressure in the control duct causing deflection of the diaphragm 71 to the right and movement of the valve member to a position in which an increased flow of liquid is admitted through the valve 75, 77. The flow of fuel is increased until the normal ratio of the weight flow of fuel with respect to the weight flow of air is re-established. When the correct flow is established, the reaction of the liquid on the rotor 59 is increased to an amount equal to the torque excited by the air rotor 25 with the result that the forces exerted by the magnets 63 and 65 are equal and opposed. The regulator is now in equalibrium. It is evident that the equilibrium is not affected by changes in the speed of the motor 21 since an increase or decrease in the motor speed causes a proportional increase and decrease in the speeds of both impellers 23 and 44.

Assuming now for example that for some reason the amount of air flowing through the regulator be decreased, it is apparent that as a consequence the torque exerted on the air rotor 25 is decreased permitting momentarily the liquid rotor to adjust the rotary valve 30 through the magnetic coupling 63, 65. As a result the control port 33 is opened further causing an increase in pressure in the control duct 34. The increased pressure moves the diaphragm 71 to the left whereby the flow of liquid is correspondingly decreased. It is thus evident that a constant ratio between the weight flow of two fluids, air and liquid is automatically maintained.

In the illustrated embodiment of the invention the amount of air flowing through the regulator is determined by the demand of the internal combustion engine connected to the outlet flange 14. If the demand increases the differential pressure across the throttle valve member 39 increases causing the valve member automatically to open further if the stop 91 permits. Reduction in the demand of air and fuel mixture causes a decrease in the pressure and the outlet passage 15 and a corresponding movement of the throttle valve 39. The limits of the movement of the throttle valve may be set by appropriate adjustment of the arm 89.

It will be noted in this connection that the throttle valve 39, unlike conventional throttle valves, is not directly actuated as it is for example by the accelerator pedal of an automobile. In the illustrated apparatus the throttle valve member adjusts itself automatically in dependence on the differential pressure acting on it. Thus forceful rapid opening of the throttle valve beyond its proper position is prevented which, as is well known, causes an abnormal increase in pressure at the carburetor nozzle 83 accompanied by a substantial decrease in air velocity resulting in incomplete atomization and unsatisfactory mixture between air and fuel. In the illustrated carburetor, substantial air velocities are maintained at all times at the point where fuel is injected into the air stream and complete mixing between air and fuel is thus insured.

An adjustment of the arm 89 moving the stop 91 corresponds to the direct actuation of the throttle valve in conventional carburetors. In the present instance, however, adjustment of the limit stop towards the open position permits automatic increased opening of the throttle valve 39 without forcing the throttle valve member so to move immediately. After adjustment of the stops towards the open position the throttle valve member opens automatically in response to the differential pressure but not so fast as to cause the pressure differential between the outlet passage 15 and the air chamber 38 to drop to practically zero, a condition often present in conventional installations which leads to incomplete atomization of the fuel. Restriction of the rate of opening of the throttle valve 39 is a particular feature of the invention.

If the flow of combustible mixture is to be decreased the limit stop is moved in the opposite direction. This causes forcible adjustment of the throttle valve 39 towards the closed position, Forcible movement in this direction, however, does not have the injurious consequences which forcible opening has and is for this reason not objectionable.

Regardless of whether the flow through the outlet passage 15 is increased or decreased, the regulator operates to maintain a predetermined ratio of gas to liquid, or air to fuel, constant. The ratio of flows is not affected by changes in density since the flow responsive members of the apparatus are responsive to the mass flow, or weight flow, rather than the volume flow. It is for this reason possible to employ the invention advantageously for the control of fluids which undergo substantial changes in density. Apparatus embodying the invention are admirably suited for proportioning flows of liquid which occasionally or constantly are mixed with gas. Since the control of the apparatus is not affected by such mixture it remains at all times responsive to the actual mass flow.

While the illustrated embodiment shows the application of the invention to the control of the flow of a liquid with respect to the flow of a gas, it is evident that the invention is not limited thereto. The ratio of several liquids may be controlled in the same manner as may be the ratio of several flows of gas.

The illustrated embodiment of the invention is particularly adapted for use in connection with carburetors for internal combustion engines. Advantage is taken in the illustrated construction of the particular conditions present in carburetor installations to operate certain elements of the regulator. For example, the pressure difference between the outlet passage 15 and the inlet passage 13 is utilized for operating the diaphragm-actuated valve 70, 75, 77 through the control valve 30, 33. Obviously, other forms of servo-motors could be substituted for the actuating diaphragm 70 and other forms of relays could be employed for actuating the servo-motor than a pressure fluid valve.

The energy imparted to the liquid particles and measured in the illustrated regulator by reaction exerted on a rotor may be determined in other ways, for example, by directly determining the amount of energy required for imparting a predetermined acceleration to the mass of the fluid. Thus, the torques required for driving the impellers for the various fluids have the same relation as the reaction forces exerted by the fluids against the fluid obstacles which the rotors represent.

The illustrated form of regulator is specifically designed for maintaining a predetermined fixed ratio between several flows of fluid. The ratio to be maintained can manifestly be changed by changing the ratio between the control impulses created in the regulator. This may be done by varying the speed ratio between the several impellers or by changing the magnitude of the control torques applied to the control relay or valve 30, 33. Simpler, and more convenient yet, is the use of fluid flow dividing devices in connection with a regulator of fixed ratio, the fluid flow proportioning devices being adjustable to divide out of a controlled flow passing through the regulator a predetermined fraction, which is utilized, while the remainder is returned to the source of fluid and thence passed through the regulator again. It is possible to pass a large flow through the regulator resulting in great accuracy of control, and then divide out of the large controlled flow a predetermined small fraction, which again can be done with great accuracy. The small fraction is then utilized together with the other controlled flow passing through the regulator. Thus flow ratios of the order of one hundred to one or less can be obtained with great accuracy whereas control of very small flows in a regulator could present considerable difficulties.

It thus becomes evident that the invention may be applied to and practiced by various forms of apparatus but is not limited to the specific device illustrated in the drawings. Thus numerous changes, additions, omissions, substitutions and modifications may be made without departing from the spirit, teaching and principles of the invention.

What is claimed is:

1. A fluid ratio regulator comprising, in combination, means responsive to the weight flow of a first fluid for producing a first control torque bearing a predetermined proportion to the weight flow of said first fluid; means responsive to the weight flow of a second fluid for producing a second control torque bearing said same predetermined proportion to the weight flow of said second fluid; a movable member acted upon by said first and second torques and adapted to be moved by inequality of said torques; and means governed by said movable member for increasing and decreasing the flow of said second fluid.

2. A fluid ratio regulator comprising, in combination, a duct for a first fluid; a second duct for a second fluid; first means for accelerating the particles of the fluid flowing through said first duct; a first movable obstacle in the path of the accelerated first fluid; second means for accelerating the particles of the fluid flowing through said second duct in a predetermined ratio with respect to the acceleration imparted to said first fluid by said first accelerating means; a second movable obstacle in the path of the accelerated second fluid; a movable control member acted upon in an opposite sense by said first and second fluid obstacle respectively; and means governed by said movable member for increasing and decreasing the flow of said second fluid.

3. A fluid ratio regulator comprising, in combination, a duct for a first fluid; a second duct for a second fluid; a first rotary impeller for accelerating the particles of the fluid flowing through said first duct; a first rotor impinged upon by the accelerated particles of said first fluid; a second rotary impeller for accelerating the particles of the fluid flowing through said second duct; a second rotor impinged upon by the accelerated particles of said second fluid; means for driving said first and second impellers at a predetermined constant ratio; a control member acted upon in opposite sense by said first and second rotors; and means governed by said control member for increasing and decreasing the flow of said second fluid.

4. A fluid ratio regulator comprising, in combination, a housing having a first passage therethrough for a first fluid and a second passage for a second fluid; a first rotary impeller in said first passage; a second rotary impeller in said second passage; means for driving said first and said second impellers at a constant speed ratio; a first rotor in said first passage, said first rotor having vanes adapted to be impinged upon by fluid particles accelerated by said first impeller; a second rotor in said second passage, said second rotor being mounted substantially coaxially with said first rotor and having vanes adapted to be impinged upon by fluid particles accelerated by said second impeller; a control valve member having a shaft connected with one of said rotors; a magnetic coupling between said shaft and the other of said rotors tending to move said shaft against the action of said one rotor; a servo-motor governed by said control valve; and means actuated by said servo-motor for increasing and decreasing the flow of said second fluid.

5. A fluid ratio regulator comprising, in combination, a housing having a first passage therethrough for a first fluid and a second passage for a second fluid; a first rotary impeller in said first passage, said impeller having substantially radially extending blades; a second rotary impeller in said second passage, said second impeller being coaxially mounted with said first impeller and having substantially radially extending blades; means for driving said first and said second impeller at a constant speed ratio; a first rotor mounted in said first passage coaxially with said first impeller, said rotor having substantially radially extending vanes peripherally arranged with respect to said first impeller, said vanes being impinged upon by fluid accelerated by said first impeller; a second rotor mounted in said second passage coaxially with said second impeller, said second rotor having substantially radially extending vanes peripherally arranged with respect to said second impeller, said vanes being impinged upon by fluid accelerated by said second impeller; a pilot valve member having a shaft connected with one of said rotors; magnetic coupling means between said shaft and the other of said rotors tending to move said shaft against the action of said one rotor; a flow control valve in said second passage for increasing and decreasing the flow therethrough; and means governed by said pilot valve for actuating said flow control valve.

PAUL KOLLSMAN.

REFERENCES CITED

The following references are of record in the file of this patent:

UNITED STATES PATENTS

| Number | Name | Date |
|---|---|---|
| 2,009,711 | Mateer | July 30, 1935 |
| 2,281,411 | Campbell | Apr. 28, 1942 |
| 2,372,306 | Adair | Mar. 27, 1945 |
| 2,409,477 | De Lancey | Oct. 15, 1946 |